United States Patent Office 2,752,392
Patented June 26, 1956

2,752,392
MANUFACTURE OF PHOSPHORUS AMIDES

George A. Saul, Nitro, and Kenneth L. Godfrey, St. Albans, W. Va., assignors to Monsanto Chemical Company, St. Louis, Mo., a corporation of Delaware No Drawing. Application April 11, 1952,
Serial No. 281,886

19 Claims. (Cl. 260—545)

This invention relates to improvements in the manufacture of phosphorus amides. The phosphorus amides contain the group

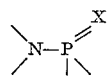

where X represents oxygen or sulfur. The invention particularly relates to phosphorus amides derived from secondary amines, as for example bis(dialkylamido)-halophosphates of the general formula

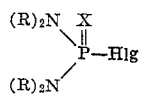

where X represents oxygen or sulfur and Hlg represents a halogen atom. The invention also relates to the controlled hydrolysis of these intermediates to pyrophosphoramides.

Bis(dialkylamido)halophosphates are important intermediates for the manufacture of insecticidal compositions. They have been made by reacting a phosphoryl halide with a dialkylamine in a molar ratio of 1:4 and separating the product from by-product dialkylamine hydrochloride. The chemical equation for this reaction employing phosphoryl chloride and dimethylamine is as follows:

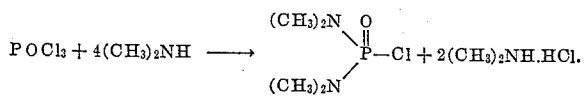

Although this manufacture is used, it is expensive, time-consuming and inefficient. Amine hydrochlorides are hygroscopic bulky solids. Large volumes of solvent must be used or the reaction mixture cannot be mixed properly. Subsequent removal of the hygroscopic solids is extremely troublesome. Furthermore, it is essential that they be removed and the amine recovered since amines are expensive reagents.

It is an object of the present invention to provide an improved process for the manufacture of phosphorus amides. A specific object is to provide an improved process for the manufacture of bis(dialkylamido)halophosphates. Another specific object is to provide a more efficient and economical process for the manufacture of octaalkylpyrophosphoramides. A further object is to provide a process for the manufacture of octaalkylpyrophosphoramides direct from phosphoryl halides and secondary amines. A still further object is to eliminate the step of separating hygroscopic amine salts. Still another object is to avoid the necessity of recovering amines. Still another object is to employ cheap neutralizing agents instead of hydrogen chloride acceptors in the manufacture of phosphorus amides. Another object is to provide a reaction which produces octaalkylpyrophosphoramides at temperatures low enough to reduce colored by-products. Still another object is to provide a process which yields phosphorus amides of satisfactory commercial grade without necessitating purification steps. Other and further objects will be apparent from the detailed description following.

It has been discovered that these objects may be accomplished by associating a phosphoryl halide or thiophosphoryl halide, a secondary amine and a base in amount substantially equivalent to the hydrogen chloride expected from the reaction desired. The term base is used to means a compound which forms a salt by double decomposition from reaction with an acid. In our prior co-pending application Serial No. 240,035, filed August 2, 1951, now abandoned, of which the present application is a continuation-in-part, there is described a process of making amidohalophosphates which includes the step of treating the reaction mixture of a phosphoryl halide and amine with a hydroxide of a metal above yttrium in the displacement series. It has now been found that the neutralizing agent need not necessarily be a hydroxide and bases which form salts by double decomposition and preferably those which form water and a neutral salt from reaction with hydrogen halide are suitable generally. It has been further found that the product formed is primarily a function of the ratios of amine and base to the phosphoryl halide.

Suitable bases include salts of weak acids and of hydroxides of metals above yttrium in the displacement series as well as hydroxides per se. Examples comprise sodium carbonate, sodium bicarbonate, potassium carbonate, trisodium phosphate, lithium hydroxide, barium hydroxide, calcium hydroxide, sodium hydroxide, strontium hydroxide, magnesium hydroxide and mixtures thereof. Probably the most satisfactory results have been obtained with sodium carbonate and with mixtures of sodium hydroxide and calcium hydroxide in molar proportions of approximately 2:1. The amount of base used should be substantially equivalent to the total hydrogen halide expected in the desired reaction. It is advisable to employ a quantity in the range of 105–110% of the calculated quantity. Any free acid present rapidly attacks the phosphorus amido groupings. Of course the total amount of base depends on how far the reaction is to be carried. If the reaction is to be terminated at an amidohalophosphate stage instead of at the end of a hydrolysis step, less base should be used. The base may be incorporated into the reaction mixture in solid form or in aqueous solution or in aqueous suspension but excessive quantities of water should be avoided.

In general reaction is facilitated and carried out much more conveniently if an inert organic solvent or diluent is used. The most satisfactory results have been obtained with halogenated hydrocarbon solvents, as for example trichloroethylene, ethylene dichloride and chloroform, and particularly preferred are those possessing a favorable partition coefficient with respect to water. Other suitable inert water immiscible solvents are toluene, kerosene and benzene. It is preferred gradually to add the amine to the phosphoryl halide and then add the base to the mixture of amine and phosphoryl halide although the order of mixing is subject to variation. When carbonates are employed, carbon dioxide is of course evolved so the gradual addition of the base is desirable in order to aid in control of foaming.

The conditions of reaction will vary depending upon the product desired. For the preparation of bis(dialkylamido)halophosphates having short chain alkyl groups a reaction temperature in the vicinity of 0 to 10° C. is desirable throughout. The reason is to avoid loss of amine since the lower dialkylamines are highly volatile. For example, only a small yield of bis(dimethylamido)chlorophosphate was obtained at 50° C., the main constituent being dimethylamidodichlorophosphate. However, reaction in an autoclave or other closed system will avoid the difficulty. In general reacting the phosphoryl halide and amine at a temperature within the range of −15 to 50° C. is feasible. For the neutralization reaction temperatures of −10 to 30° C. proved satisfactory in an open system.

The secondary amine should be employed in proportion substantially equal to that theoretically required by the desired reaction. The amine is preferably used in slight excess since reactions carried out with the phosphoryl halide instead of the amine in slight excess have given less satisfactory results. Especially suitable are secondary dialkylamines containing one to four carbon atoms in the alkyl group, as for example dimethylamine, diethylamine, dipropylamine, di-isopropylamine, dibutylamine and methylethylamine.

For preparation of pyrophosphates only substantially two moles of amine per mole of phosphoryl halide should be used but substantially three equivalents of base are required. The water of neutralization is sufficient although additional water may be added if desired. It has been found, however, that the addition of more water than produced by the neutralization of the hydrogen halide is unnecessary. The hydrolysis and condensation of the amidohalophosphates is greatly speeded by heating. The reactions can be finished in a short time by gentle heating. A mixture of two moles of phosphoryl chloride and four moles of dimethylamine and three moles of sodium carbonate rapidly evolves carbon dioxide at 0–5° C. The evolution of carbon dioxide substantially ceases and then becomes rapid again at 30–40° C., indicating that conversion of the intermediate to the desired pyrophosphoramide is taking place rapidly.

The following examples are illustrative of the invention but the invention is not limited thereto.

*Example 1*

206 parts by weight (substantially 1.34 moles) of phosphoryl chloride ($POCl_3$) is admixed with 777 parts by weight of trichloroethylene in a suitable reaction vessel and thereto is slowly added with agitation at −5 to 5° C. 135 parts by weight (substantially 3.0 moles) of dimethylamine. Upon completion of the amine addition the mix is agitated for about 5–10 minutes at 0–5° C. Thereupon, while maintaining the temperature at about 0–5° C., 54.9 parts by weight (substantially 0.74 mole) of calcium hydroxide is added over a 40 minute period with agitation. Then 116.4 parts by weight (substantially 1.48 moles) of 50.9% aqueous sodium hydroxide is incorporated in the mix with stirring over a 20 minute period while maintaining the temperature at 0–5° C. The organic layer is then decanted and filtered. Upon fractionating the filtrate a yield of 80.5% of bis(dimethylamido)chlorophosphate of 97.1% purity is obtained.

Employing the same reagents, proportions thereof, and reaction conditions but replacing the total metal hydroxide reactant with an equivalent proportion of potassium hydroxide in the form of a 60% aqueous solution, an excellent yield of bis(dimethylamido)chlorophosphate of high purity is obtained.

*Example 2*

307 parts by weight (substantially 2.0 moles) of phosphoryl chloride ($POCl_3$) is admixed with 1000 parts by weight of ethylene dichloride in a suitable reaction vessel and thereto is slowly added with agitation at −5 to 5° C. 201 parts by weight (substantially 4.46 moles) of dimethylamine. Thereupon, while maintaining the temperature at about 10–15° C., 270 parts by weight (substantially 4.40 moles) of potassium hydroxide (91.5% pure) in the form of a 58.5% aqueous solution is incorporated in the mix with stirring over a 55 minute period while maintaining the temperature at 10–15° C. After stirring the mix at approximately 10° C. for one-half hour, the organic layer is then decanted and filtered through Attapulgus clay. Upon fractionating the filtrate a yield of 72.9% of bis(dimethylamido)chlorophosphate of 88.3% purity is obtained.

Employing the same reagents, proportions thereof, and reaction conditions but replacing dimethylamine with an equimolar amount of diethylamine, a good yield of bis(diethylamido)chlorophosphate of high purity is obtained.

*Example 3*

921 parts by weight (substantially 6.0 moles) of phosphoryl chloride ($POCl_3$) is admixed with 3500 parts by weight of trichloroethylene in a suitable reaction vessel and thereto is slowly added with agitation at 0–5° C. 600 parts by weight (substantially 13.3 moles) of dimethylamine. 1090 parts by weight of aqueous 48.8% sodium hydroxide solution (substantially 13.3 moles) are then incorporated in the mix with stirring over a 67 minute period while maintaining the temperature at 10–15° C. The mix is then stirred for 30 minutes at 10–15° C. The organic layer is then decanted and fractionated to give a yield of 85% of bis(dimethylamido)chlorophosphate of 86.5% purity.

*Example 4*

677.6 parts by weight (substantially 4.0 moles) of thiophosphoryl chloride ($PSCl_3$) is mixed with 1349 parts by weight of chloroform in a suitable reaction vessel. Gaseous dimethylamine is then fed into the stirred mixture, a total of 392 parts by weight (substantially 8.7 moles) being added below 30° C., the time of addition depending upon the efficiency of cooling. The reaction mixture is then cooled to 10–15° C. and 645 parts by weight (substantially 8.0 moles) of 49.6% aqueous sodium hydroxide added gradually thereto with stirring. The reaction becomes strongly exothermic after about two-thirds of the caustic solution is added but the temperature is kept below about 15° C. by cooling. The caustic solution is added over a period of about 95 minutes. The organic layer is then decanted from the salt cake-water mixture and the solvent stripped off by distillation under vacuum. The crude product, free of solvent, is filtered and fractionated under vacuum. A 79.5% yield of bis(dimethylamido)chlorothionophosphate based on the $PSCl_3$ is obtained. Crystallizing point is 21.6° C.; B. P. 80–82° C./2 mm. and refractive index $N_D^{25}=$ 1.5209. Chlorine found by analysis is 19.3% as compared to the calculated value of 19.0%.

*Example 5*

Into a suitable reaction vessel is charged 338.8 parts by weight of thiophosphoryl chloride ($PSCl_3$) and about 800 parts by weight of trichloroethylene. 92 parts by weight of gaseous dimethylamine are fed in while keeping the reaction mixture below 30° C. and 106 parts by weight of finely divided sodium carbonate are then gradually added to the stirred mixture at 0–5° C. After carbon dioxide evolution from the cold reaction mixture ceases the salt is removed by filtration. The solvent is removed by distillation under vacuum and the crude product distilled at 16 mm. pressure. There is obtained approximately a 33.4% yield of dimethylamidodichlorothionophosphate, B. P. 89–90° C./16 mm. Analysis for chlorine gives 39.7% as compared to the calculated value of 39.9%.

Example 6

307 parts by weight (substantially 2.0 moles) of phosphoryl chloride ($POCl_3$) is mixed with 1000 parts by weight of ethylene dichloride. Gaseous dimethylamine is slowly run into the mixture at −5 to 5° C., a total of 99 parts by weight (2.2 moles) being added. Thereupon, while maintaining the temperature at about 0–5° C., 127 parts by weight (1.2 moles) of finely powdered sodium carbonate are added and the mixture stirred for a short time to complete the neutralization of the amine salt and reaction of the released amine. The reaction mixture is then filtered, the cake washed with ethylene dichloride and the solvent removed from the filtrate and washings by distillation and the crude product fractionated by distillation. A good yield of dimethylamidodichlorophosphate is obtained, B. P. 90–91° C./22 mm.

Example 7

307 parts by weight (substantially 2.0 moles) of phosphoryl chloride ($POCl_3$) is admixed with 2000 parts by weight of trichloroethylene in a suitable reaction vessel and thereto is slowly added with agitation at a temperature below 35° C. 190 parts by weight (substantially 4.2 moles) of dimethylamine. 222.6 parts by weight (substantially 2.1 moles) of finely powdered sodium carbonate are then added over a period of about one-half hour while keeping the temperature at about 10° C. The reaction mixture is stirred at not more than about 30° C. for 4 hours or until carbon dioxide is no longer evolved and then filtered and the salt cake washed with trichloroethylene. The combined filtrate and washings are stripped of solvent by distillation under vacuum. The crude product is then fractionated by distillation under reduced pressure. A good yield of bis(dimethylamido)chlorophosphate is obtained, B. P. 93–99° C./6mm. containing 20.7% chlorine by analysis as compared to the calculated value of 20.8%.

Example 8

306.8 parts by weight of phosphoryl chloride ($POCl_3$) and approximately 880 parts by weight of trichloroethylene are weighed into a suitable reactor equipped with a gas inlet tube, agitator, thermometer, and valve for release of excess pressure. 190 parts by weight of gaseous dimethylamine are passed into the closed flask (vented by the valve (above the surface of the well-agitated contents over a period of about one hour, the temperature being held below 35° C. by appropriate cooling. The reaction mixture is cooled to 0–10° C., the gas inlet tube removed, and the addition of 340 parts by weight of sodium carbonate begun. During this addition, which requires about 50 minutes, the temperature is held at 0–10° C. A steady evolution of carbon dioxide begins during the carbonate feed. The reaction mixture is then agitated at 0–10° C. for 2 hours; over the next 2½ hours it is heated gradually to 70° C. and it is maintained at 70–80° C. for 4 additional hours during which time the carbon dioxide evolution subsides. The reaction mixture is cooled to room temperature and suction filtered. The salt cake residue is washed with trichloroethylene. Filtrate and washings are combined and freed of solvent by vacuum stripping to a pot temperature of 110° C./30 mm. The product is filtered with a small amount of Attapulgus clay for clarification. The filtrate is a clear, yellow liquid. It constitutes a yield of about 87.5% based on the $POCl_3$ of technical octamethylpyrophosphoramide.

The foregoing procedure is repeated through the addition of the dimethylamine and the reaction mixture cooled to 3° C. 285 parts by weight of 40.9% aqueous sodium hydroxide solution is added gradually while keeping the temperature below 15° C. 143 parts by weight of flake sodium hydroxide is then added and the reaction mixture heated at 78–79° C. for about 3 hours and then cooled. The salt is removed by filtration and the combined filtrate and washings stripped of solvent to a pot temperature of 110° C./30 mm. The residue is then filtered from by-product solids leaving the crude liquid octamethylpyrophosphoramide. However, a much higher yield is obtained when sodium carbonate is employed instead of sodium hydroxide.

Example 9

306 parts by weight of the product of Example 1 are charged into a suitable reaction vessel. 16 parts by weight of water and 100 parts by weight of finely powdered sodium carbonate are added thereto with efficient stirring while keeping the temperature below 40° C. The temperature is then allowed to rise to about 47° C. and then kept within the range of 40–45° C. by suitable cooling. The exothermic reaction is then permitted to proceed more rapidly, the temperature rising to 62° C. after about an hour. When the evolution of gas ceases after heating at about 70° C. the reaction mixture is diluted with chloroform and filtered, the filter cake being washed with chloroform. The solvent is removed from the filtrate and washings by distillation under vacuum. The product residue is then filtered with a small amount of Attapulgus clay for clarification. A good yield of technical octamethylpyrophosphoramide is obtained.

Example 10

206 parts by weight of phosphoryl chloride (substantially 1.34 molecular proportions) and 1000 parts by weight of chloroform are charged into a suitable reaction vessel and thereto is slowly added 218 parts by weight (substantially 4.83 molecular proportions) of dimethylamine. 4.82 molecular proportions of sodium hydroxide are then added gradually as a 50% aqueous solution while keeping the temperature at 13–16° C. Stirring is continued for about an hour during which time the reaction mixture is allowed to come to room temperature and stirring continued for another hour. The salt is removed by filtration, the filtrate and washings combined and the solvent stripped off by distillation to 95° C./25 mm. There is obtained 185 parts by weight of hexamethylphosphoramide, B. P. 94–96° C./6 mm., $N_D^{25}$ 1.4569.

While the reactions have been described with reference to chlorides since these are desired for reasons of economy, other halogens may be employed. Thus, "halogen" or "halo" substituents unless otherwise specified are meant to include chlorine, bromine, iodine and fluorine.

It is intended to cover all changes and modifications of the examples of the invention herein chosen for purposes of disclosure which do not constitute departures from the spirit and scope of the invention.

What is claimed is:

1. The method of making phosphorus amides which comprises reacting one molecular proportion of $PXCl_3$ where X represents a member of the group consisting of oxygen and sulfur and at least one but not more than about three molecular proportions of a dialkylamine containing less than five carbon atoms in each alkyl group and then to the reaction mixture gradually adding with stirring at least one but not more than about three molecular equivalents of an inorganic base, the amount being substantially equivalent to that required for neutralization of the total hydrogen chloride expected from the desired end product which base comprises a metal above yttrium in the displacement series and is characterized by forming water and a neutral salt by double decomposition in the neutralization.

2. The method of making phosphorus amides which comprises reacting one molecular proportion of $PXCl_3$ where X represents a member of the group consisting of oxygen and sulfur and at least one but not more than about three molecular proportions of a dialkylamine containing less than five carbon atoms in each alkyl group and then to the reaction mixture gradually adding with stirring at least one but not more than about three molecular equivalents of sodium carbonate, the amount being substantially equivalent to that required for neutralization of the total hydrogen chloride expected from the desired end product.

3. The method of making bis(dialkylamido)chlorothionophosphates which comprises reacting substantially one molecular proportion of $PSCl_3$ and substantially two molecular proportions of a dialkylamine containing less than five carbon atoms in each alkyl group, then to the reaction mixture gradually adding with stirring substantially two equivalents of an inorganic base which comprises a metal above yttrium in the displacement series and is characterized by forming water and a neutral salt by double decomposition in the neutralization and isolating the bis(dialkylamido)chlorothionophosphate before it is appreciable hydrolyzed.

4. The method of making a dialkylamidochlorothionophosphate which comprises reacting substantially one molecular proportion of $PSCl_3$ and at least one but not more than two molecular proportions of a dialkylamine containing less than five carbon atoms in each alkyl group, then to the reaction mixture gradually adding with stirring an inorganic base in proportion substantially equivalent to the dialkylamine which base comprises a metal above yttrium in the displacement series and is characterized by forming water and a neutral salt by double decomposition in the neutralization and isolating a dialkylamidochlorophosphate.

5. The process of making bis(dimethylamido)chlorophosphate which comprises reacting substantially one molecular proportion of $POCl_3$ and substantially two molecular proportions of dimethylamine and then to the reaction mixture gradually adding with stirring substantially one molecular proportion of sodium carbonate and isolating bis(dimethylamido)chlorophosphate.

6. The process of claim 5 in which the reaction is carried out below 35° C.

7. The process of claim 5 carried out in a water immiscible solvent.

8. The process of making an octaalkylpyrophosphoramide which comprises reacting substantially two molecular proportions of $POCl_3$ and substantially four molecular proportions of a dialkylamine containing less than five carbon atoms in each alkyl group, then to the reaction mixture gradually adding with stirring substantially six equivalents of an alkali metal carbonate and heating until evolution of carbon dioxide substantially ceases.

9. The process of making octamethylpyrophosphoramide which comprises reacting in an inert water immiscible solvent substantially two molecular proportions of $POCl_3$ and substantially four molecular proportions of dimethylamine, then to the reaction mixture gradually adding with stirring substantially three molecular proportions of sodium carbonate and heating below 100° C. until evolution of carbon dioxide substantially ceases.

10. The process of making hexaalkylphosphoramides which comprises reacting one molecular proportion of $PXCl_3$ where X is selected from the group consisting of oxygen and sulfur, approximately three molecular proportions of a dialkylamine and then with stirring gradually adding to the reaction mixture at least three equivalents of an inorganic base which comprises a metal above yttrium in the displacement series and is characterized by forming water and a neutral salt by double decomposition in the neutralization.

11. The process of making hexamethylphosphoramide which comprises reacting one molecular proportion of $POCl_3$, approximately three molecular proportions of dimethylamine and then with stirring gradually adding to the reaction mixture at least three equivalents of an inorganic base which comprises a metal above yttrium in the displacement series and is characterized by forming water and a neutral salt by double decomposition in the neutralization.

12. The process of making octamethylpyrophosphoramide which comprises reacting in a water immiscible solvent inert to the reactants substantially two molecular proportions of $POCl_3$ and substantially four molecular proportions of dimethylamine, then to the reaction mixture gradually adding substantially three molecular proportions of sodium carbonate with stirring and sufficient cooling that the temperature of the reaction mixture does not rise above about 10° C. and finally heating at about 70-80° C. until the evolution of carbon dioxide substantially ceases.

13. In the process of making bis(dialkylamido)halophosphates the steps which comprise reacting a lower dialkyl amine with a phosphoryl halide in a molar proportion of approximately 2:1 in the presence of an inert water-immiscible solvent and then gradually adding with stirring to the reaction mix so obtained at a temperature below about 30° C. a hydroxide of a metal selected from the group consisting of alkali and alkaline earth metals and mixtures of said metals, the proportion of the said hydroxide being substantially equivalent to but not more than about 110% of the theoretical amount.

14. In the process of making bis(dialkylamido)chlorophosphates the steps which comprise reacting a lower dialkyl amine with phosphoryl chloride in a molar proportion of approximately 2:1 in the presence of a halogenated hydrocarbon solvent therefor and then gradually adding with stirring to the reaction mix so obtained at a temperature below about 30° C. a hydroxide of a metal selected from the group consisting of alkali and alkaline earth metals and mixtures of said metals in an amount substantially equivalent to but not more than about 110% of the chemical equivalent of the phosphoryl chloride reactant.

15. In the process of making bis(dimethylamido)chlorophosphate the steps which comprise reacting at −15 to 50° C. dimethyl amine with phosphoryl chloride in a molar proportion of approximately 2:1 in the presence of trichloroethylene and then gradually adding with stirring at −10 to 30° C. to the reaction mix so obtained concentrated aqueous sodium hydroxide in an amount substantially equivalent to but not more than about 110% of the chemical equivalent of the phosphoryl chloride reactant.

16. In the process of making bis(diethylamido)chlorophosphate the steps which comprise reacting at −15 to 50° C. diethyl amine with phosphoryl chloride in a molar proportion of approximately 2:1 in the presence of trichloroethylene and then gradually adding with stirring at −10 to 30° C. to the reaction mix so obtained concentrated aqueous sodium hydroxide in an amount substantially equivalent to but not more than about 110% of the chemical equivalent of the phosphoryl chloride reactant.

17. In the process of making (bis(dimethylamido)chlorophosphate the steps which comprise reacting at −15 to 50° C. dimethyl amine with phosphoryl chloride in a molar proportion of approximately 2:1 in the presence of chloroform and then gradually adding with stirring at −10 to 30° C. to the reaction mix so obtained concentrated aqueous sodium hydroxide in an amount substantially equivalent to but not more than about 110% of the chemical equivalent of the phosphoryl chloride reactant.

18. In the process of making bis(dimethylamido)chlorophosphate the steps which comprise reacting at −15 to 50° C. dimethyl amine with phosphoryl chloride in a molar proportion of approximately 2:1 in the presence of trichloroethylene and then gradually adding with stirring at −10 to 30° C. to the reaction mix so obtained calcium hydroxide in an amount substantially equivalent to but not more than about 110% of the chemical equivalent of the phosphoryl chloride reactant.

19. In the process of making bis(dimethylamido)chlorophosphate the steps which comprise reacting at −15 to 50° C. dimethyl amine with phosphoryl chloride in a molar proportion of approximately 2:1 in the presence of trichloroethylene and then gradually adding with stirring at −10 to 30° C. to the reaction mix so obtained a mixture of calcium hydroxide and concentrated aqueous sodium hydroxide in a molar proportion of approximately 1:2 in an amount substantially equivalent to but not more than about 110% of the chemical equivalent of the phosphoryl chloride reactant.

References Cited in the file of this patent

UNITED STATES PATENTS 2,706,738  Toy et al. _____ Apr. 19, 1955

FOREIGN PATENTS 631,549  Great Britain _____ Nov. 4, 1949
652,981  Great Britain _____ May 2, 1951

OTHER REFERENCES

Audrieth et al.: J. A. C. S., vol. 64, pp. 1553–5 (1942).

Schrader: P. B. 95, 312, printed date, Dec. 1947; publication date, April 1949; pp. 16 and 17.

Kosolopoff: "Organophosphorus compounds," pp. 279–282 (1950).